United States Patent
Carter et al.

(10) Patent No.: US 10,237,805 B2
(45) Date of Patent: Mar. 19, 2019

(54) TELECOMMUNICATIONS ROUTING SYSTEM

(71) Applicant: VODAFONE IP LICENSING LIMITED, Newbury, Berkshire (GB)

(72) Inventors: Phillip Carter, London (GB); Oscar Gallego Gomez, London (GB); Jakub Nowicki, London (GB)

(73) Assignee: VODAFONE IP LICENSING LIMITED, Newbury, Berkshire (GB)

(*) Notice: Subject to any disclaimer, the term of this patent is extended or adjusted under 35 U.S.C. 154(b) by 0 days.

(21) Appl. No.: 15/004,701

(22) Filed: Jan. 22, 2016

(65) Prior Publication Data

US 2016/0219490 A1    Jul. 28, 2016

(30) Foreign Application Priority Data

Jan. 26, 2015  (GB) .................................. 1501264.4

(51) Int. Cl.
| | |
|---|---|
| *H04W 4/00* | (2018.01) |
| *H04W 40/02* | (2009.01) |
| *H04W 8/28* | (2009.01) |
| *H04L 29/12* | (2006.01) |
| *H04W 4/14* | (2009.01) |

(52) U.S. Cl.
CPC ......... *H04W 40/02* (2013.01); *H04L 61/6054* (2013.01); *H04W 4/14* (2013.01); *H04W 8/28* (2013.01)

(58) Field of Classification Search
CPC ......... H04W 40/02; H04W 4/14; H04W 8/28; H04L 61/6054

USPC .......................................... 455/466; 370/338
See application file for complete search history.

(56) References Cited

U.S. PATENT DOCUMENTS

| | | | |
|---|---|---|---|
| 2002/0145981 A1* | 10/2002 | Klinker ............... | H04L 41/0816 370/244 |
| 2005/0111640 A1 | 5/2005 | Moisey et al. | |
| 2006/0240819 A1 | 10/2006 | Xu et al. | |
| 2006/0293021 A1 | 12/2006 | Zhou | |
| 2008/0201441 A1* | 8/2008 | Bodic ..................... | H04L 51/04 709/206 |

(Continued)

FOREIGN PATENT DOCUMENTS

WO      2013127667 A1    9/2013

OTHER PUBLICATIONS

GB Search Report for GB1501264.4 dated Jun. 25, 2015.

(Continued)

*Primary Examiner* — Marcos Batista
(74) *Attorney, Agent, or Firm* — Workman Nydegger (57) ABSTRACT

In Internet Protocol communications based on mobile station number (MSISDN) such as Rich Communication Services (RCS), the operator in a region which should be used to route services to a user device addressed by a mobile station number can be determined by recording which operator is the source of any capabilities exchange or signed presence subscription messages relating to the mobile station number which are received. The identified operator identities can then be stored in association with the respective mobile station numbers in a routing database. Messages to be sent to mobile station numbers can then be routed based on respective stored operator identities associated with the mobile station numbers in the routing database.

24 Claims, 6 Drawing Sheets

(56) References Cited

U.S. PATENT DOCUMENTS

| | | | | |
|---|---|---|---|---|
| 2012/0155445 A1* | 6/2012 | Javaregowda | ...... | H04L 65/1069 370/338 |
| 2014/0179279 A1* | 6/2014 | Skeba | ..................... | G06F 3/048 455/414.1 |
| 2015/0141003 A1* | 5/2015 | Dumbleton | ............. | H04W 4/20 455/433 |

OTHER PUBLICATIONS

European Search Report issued in Application No. 16152229 dated Apr. 18, 2016.
Van Pelt "RCS-e—Advanced Communications: Services and Client Specification", Jul. 4, 2012, XP055263476, URL: http://www.gsma.com/network2020/wp-content/uploads/2012/03/rcs-e_advanced_comms_specification_v1_2_2_approved.pdf [retreived Apr. 7, 2016].

* cited by examiner

TELECOMMUNICATIONS ROUTING SYSTEM

CROSS REFERENCE TO RELATED APPLICATIONS

This application claims priority to United Kingdom Application Number 1501264.4, filed on Jan. 26, 2015, the entirety of which is incorporated herein by reference.

BACKGROUND

When providing telecommunications services such as voice calls, Short Message Service (SMS), or certain Internet Protocol communications such as Rich Communications Suite (RCS), the desired destination user device is addressed using the mobile station or mobile subscriber number (MSISDN) of the destination user device. However, most territories have a number of different competing mobile network operators who support communications with different user devices. Accordingly, in order to contact the destination user device using the mobile station number and to provide telecommunications services it is necessary to route any communications request to the specific mobile network operator who supports communications with the destination user device, commonly referred to as the specific mobile network operator which owns the mobile station number.

Generally, mobile station numbers are allocated to user devices by a national or regional number authority assigning each of the mobile network operators in a country or region a block or range of mobile station numbers. The mobile network operators then in turn assign each of their customer user devices a mobile station number taken from their respective assigned range. Historically, lists of the assigned ranges of numbers were made available to mobile network operators so that the mobile network operator supporting communications with a specific destination user device could be identified by comparing the mobile station number of the user device with the lists. Communications requests for the destination user device could then be correctly routed to the identified mobile network operator.

However, most telecommunication regulators have now introduced, or are expected to introduce in the future, mobile number portability services allowing users to keep the mobile station numbers of their user devices when they change to a new mobile network operator. As a result, the identity of the mobile network operator supporting communications with the user device using a specific mobile station number may change over time so that the lists of assigned ranges of numbers cannot be relied upon.

In order to provide voice call and SMS telecommunications services a number of approaches have been used to route telecommunications to the correct mobile network operator for a destination user device.

One model for changing operator is for a user to request a new operator to take over responsibility for supporting communications with the mobile number of a user device, and for the new operator to take over full responsibility for the mobile number, referred to as the recipient-led model. When the recipient-led model is used all mobile network operators in a country or region synchronise or combine their number databases so that all mobile network operators are aware which mobile network operator is currently supporting communications with each mobile station number.

Another model for changing mobile network operator is for a user to request authorization from their current mobile network operator to allow their new mobile network operator to use the mobile number of a user device, referred to as the donor-led model. In the donor-led model only the old and new mobile network operators are aware of the change, so that each mobile network operator is only aware of numbers which it has transferred to other mobile network operators or which other mobile network operators have transferred to it. When the donor-led model is used a communications request for a mobile number is made to the original mobile network operator for that number, and the original mobile network operator is responsible for forwarding the communications request to the new mobile network operator.

However, there may be problems in attempting to use these approaches to support Rich Communications Suite (RCS) telecommunications services. Where the recipient-led model is used it may be technically complex, difficult and expensive to combine the number databases of all of the different mobile network operators. Further, even if a combined number database is produced for all mobile network operators in a country or region it may then be complex, difficult and expensive to arrange for mobile networks located outside the country or region to access the combined database. Where the donor-led model is used it is necessary for previous mobile network operators to assist in routing by forwarding RCS communications requests to new mobile network operators, and some mobile network operators may be unable or unwilling to do this. Further, the volume of telecommunications traffic generated by RCS telecommunications services may be much higher than for voice call and SMS services, so that even where this approach is used to deal with number portability for voice call or SMS services it may not be useable for RCS telecommunications services.

A further problem with RCS telecommunications services is that third party operators, also known as over the top providers, who are not themselves mobile network operators may provide RCS telecommunications services to user mobile devices in parallel with the mobile network operator owning the mobile station number of the user mobile device. In this case it can be technically complex, difficult and costly to include the third party operators in addition to the mobile network operators in a common routing solution.

A number of approaches to address the problems of routing when providing RCS telecommunications services have been proposed, but none of these provide a satisfactory routing solution. One proposal is to outsource responsibility for providing RCS routing data to an independent third party provider separate from the mobile network operators. This approach can result in complex and fragmented solutions, and it can be technically complex and demanding to integrate all of the necessary databases.

Another proposal is for a number of mobile network operators to group together and use a common central interconnect hub to provide RCS routing services for telecommunications traffic to and from all of the mobile network operators in the group. This approach can have considerable integration costs, and it may be technically complex and difficult to integrate all of the databases of the different mobile network operators.

Another proposal is for countries using the donor-led model to simply use a similar approach as for voice calls and SMS and make the original mobile network operator responsible for routing RCS telecommunications traffic to the new mobile network operator. This has the problem that routing relies on a mobile network operator who may no longer have any relationship with either of the communicating parties, and who may not be willing, or able, to route RCS telecommunications traffic to the new mobile network operator.

Further, all of these proposals suffer from the technical problem that a mobile network operator is forced to rely on another party for routing information or services, which are a core requirement to provide an acceptable quality of service to users.

Another proposal is for two mobile network operators to be interconnected so that each mobile network operator can forward any unresolved RCS telecommunications traffic, that is any RCS telecommunications traffic for mobile device numbers which are not owned by that mobile network operator, to the other interconnected mobile network operator. This has the problem that a large amount of redundant telecommunications traffic may need to be exchanged between the two mobile network operators, and that this approach cannot be extended to more than two mobile network operators.

The discussion above relates to RCS telecommunications services. However, similar problems will apply to other Internet Protocol communications.

The embodiments described below are not limited to implementations which solve any or all of the disadvantages of the known approaches described above.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In Internet Protocol communications based on mobile station number (MSISDN) such as Rich Communication Services (RCS), the operator in a region which should be used to route services to a user device addressed by a mobile station number can be determined by recording which operator is the source of any capabilities exchange or signed presence subscription messages relating to the mobile station number which are received. The identified operator identities can then be stored in association with the respective mobile station numbers in a routing database. Messages to be sent to mobile station numbers can then be routed based on respective stored operator identities associated with the mobile station numbers in the routing database.

A first embodiment provides a method of automatically gathering routing information in a telecommunications network providing Internet Protocol "IP" communications based on mobile station number "MSISDN", the method comprising the steps of: analyzing incoming telecommunications traffic to identify messages from other telecommunications networks, which messages include mobile station numbers; and, when such a message is identified: extracting the mobile station number from the identified message; obtaining routing data for the telecommunications network from which the message was received; and storing the extracted mobile station number in association with the obtained routing data.

A second embodiment provides a method of operating a telecommunications network providing Internet Protocol "IP" communications based on mobile station number "MSISDN", the method comprising automatically gathering routing information according to the first aspect, and further comprising: sending a message to a mobile station number, the message being sent with a routing based on routing data previously stored in association with the mobile station number.

A third embodiment provides an apparatus for automatically gathering routing information from a telecommunications network providing Internet Protocol "IP" communications based on mobile station numbers "MSISDN", the apparatus comprising: an analyzer arranged to analyses incoming telecommunications traffic to identify messages from other telecommunications networks, which messages include mobile station numbers; and a number extractor arranged to extract the mobile station number from the identified messages; a routing data component arranged to obtain routing data for the telecommunications network from which each identified message was received; and a data store for storing said extracted mobile station number in association with said obtained routing data.

A fourth embodiment provides a telecommunications network providing Internet Protocol "IP" communications based on mobile station number "MSISDN", the network comprising apparatus for automatically gathering routing information according to the third aspect, and further comprising: a routing component arranged to control the routing of a message sent to a mobile station number, so that the message is sent with a routing based on routing data stored in association with the mobile station number in the data store.

A embodiment aspect provides computer software comprising a series of instructions which, when executed on a processor, will cause the processor to carry out the method according to any one of the first and second aspects.

A embodiment aspect provides a tangible computer-readable storage comprising computer-readable instructions which, when executed on a processor of a computer will cause the computer to carry out the method according to any one of the first and second aspects.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
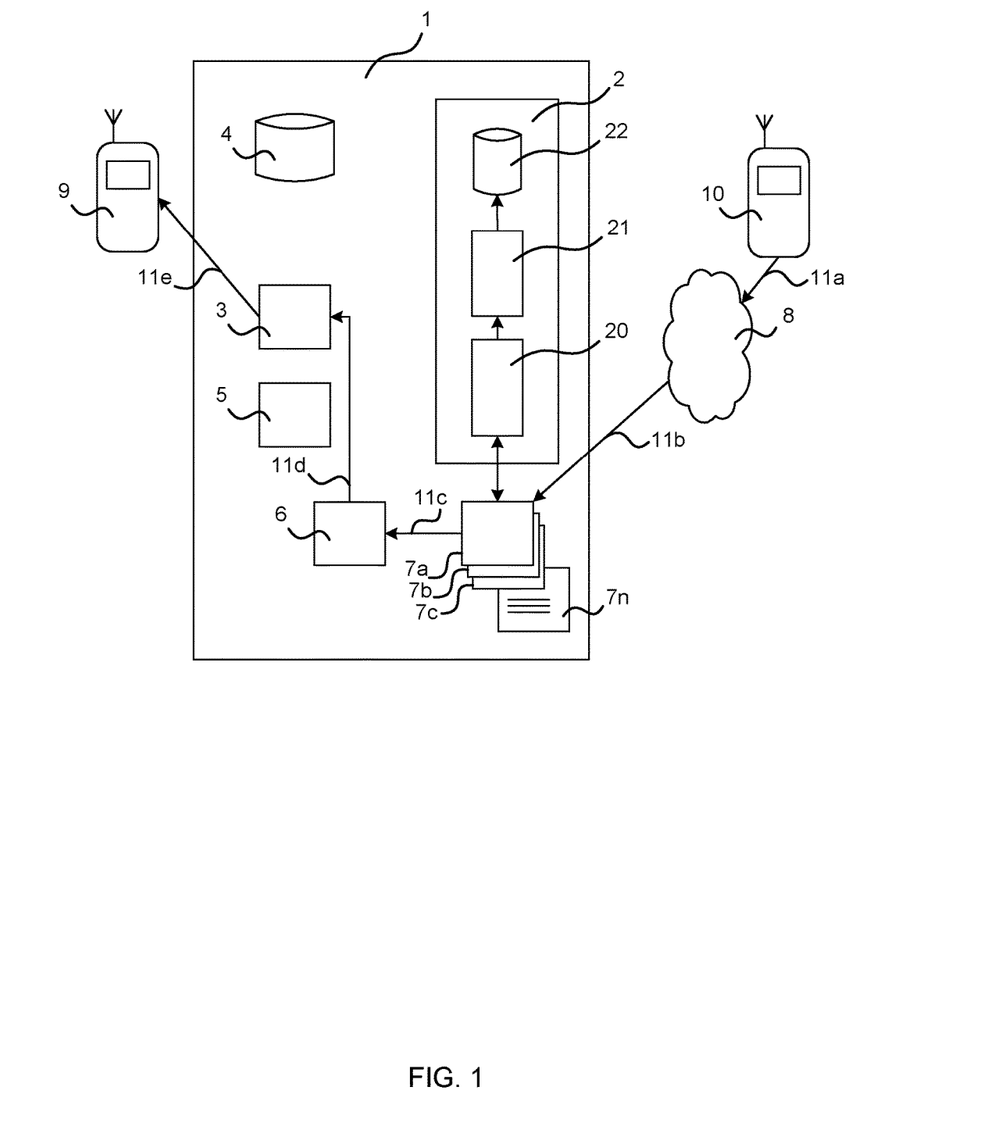
FIG. 1 is a schematic diagram of an apparatus for obtaining and storing routing information according to a first embodiment of the present invention.

FIG. 1 illustrates a routing information system for gathering and recording routing information according to a first embodiment of the present invention.

In FIG. 1, a first telecommunications network 1 is shown. The first telecommunications network 1 supports IP communications using MSISDNs, in this example Rich Communications Suite (RCS) telecommunications services, and is operated by a local mobile network operator. The first telecommunications network 1 comprises a routing information system 2 according to the present invention. The first telecommunications network 1 is shown schematically in FIG. 1 and only parts of the first telecommunications network 1 which are required to allow the present invention to be understood are shown. It will be understood that the first telecommunications network 1 will in practice comprise a very large number of other components, but these are not described or shown to improve clarity and to avoid obscuring the scope of the present invention. Throughout the present description, it will be described that the network supports RCS and the concepts will described in this context. However it will be understood that many of the concepts are also applicable to IP communications based on MSISDNs where it is important to be able to easily identify the location, destination or origin of the user device, whether that be in the network of a particular operator, a new operator or a third party IP communications network. This is further evidenced using embodiments operating the Session Initial Protocol (SIP) upon which many RCS services are based. This protocol is similarly just one example of a protocol that can be utilized to embody the described concepts.

The first telecommunications network 1 comprises a multimedia service platform 3 which supports RCS telecommunications services, and a local subscriber or user database 4, which can be accessed by the multimedia service platform 3. The local user database 4 contains data regarding users who are customers or subscribers of the local network operator, which data includes the mobile station numbers (MSISDN) of the user devices of those users.

The first telecommunications network 1 further comprises a border gateway control component 5 and an interconnect service border gateway component 6. The border gateway control component 5 acts as a routing component and selects routing paths for outbound telecommunications traffic. That is, telecommunications traffic with a destination outside the first telecommunications network 1. The interconnect service border gateway component 6 carries out telecommunications traffic management and accounting for telecommunications connections between the first telecommunications network 1 and remote telecommunications networks separate from the first telecommunications network 1. These telecommunications connections are referred to as interconnections.

The first telecommunications network 1 further comprises a number of point of interconnect (POI) components 7a to 7n. Each point of interconnect component 7a to 7n is a component through which the first telecommunications network 1 exchanges telecommunications traffic with a specific remote telecommunications network. Each point of interconnect component 7a to 7n may be a physical or logical component.

In order to provide RCS telecommunications services in an efficient manner and to meet user expectations, telecommunications systems providing RCS telecommunications services must be able to identify user devices able to participate in RCS services. A user device must have the necessary functionality to support RCS services in order to participate at all. The ability to participate also depends upon the current capabilities of the user device, which may change rapidly and unpredictably, for example due to changes in the type and quality of network access currently available to the user device. Further, the ability to participate may change based on user activities, which may also change rapidly and unpredictably, for example a user may identify themselves as unable to participate in RCS services when they are making a voice call or are in a meeting where they do not wish to be disturbed. Accordingly, the ability of user devices to participate in RCS services will change over time and so must be tracked and updated.

In order to do this, a telecommunications system providing RCS telecommunications services incorporates a capabilities exchange mechanism or a signed presence subscription mechanism, or both, to provide or retrieve up to date information on the current ability of user devices to participate in RCS services.

The telecommunications system according to the first embodiment incorporates both a capabilities exchange mechanism and a signed presence subscription mechanism.

The capabilities exchange mechanism operates when a user device indicates an intention to communicate with another user device. In one example of a capabilities exchange mechanism, when an RCS client of a first, originating, user device detects a possible intention to communicate with another, terminating, user device, the RCS client of the originating user device initiates an ad-hoc capabilities check by sending a capabilities exchange request message to the terminating user device. The capabilities exchange request message includes the mobile station number (MSISDN) of the originating user device. An RCS client of the terminating user device responds to this capabilities exchange request message by sending a capabilities exchange response message indicating the current ability of the terminating user device to participate in RCS services. The RCS client of the originating device may for example detect a possible intention to communicate with a terminating user device when a user of the originating user device opens a contact card or chat message relating to the terminating user device.

The capabilities exchange mechanism may also be used to determine the capability of user devices to participate in RCS services when user devices are initially or subsequently discovered as contacts eligible for IP services based on MSISDN.

The signed presence subscription mechanism is used in a telecommunications system providing RCS telecommunications services to allow different users to establish permanent presence exchange relationships in which user devices may actively publish their current ability to participate in RCS services, and thus act as presentities, and may also subscribe to presence notifications from other user devices, and thus act as presence watchers.

In order to preserve the privacy of users choosing to be presentities, it is usual for user devices acting as presentities to be asked to authorize any presence notification subscription requests before the requests are accepted and presence information is provided.

Accordingly, in order to become a presence watcher a user device sends a signed presence notification subscription request message identifying the user device to be subscribed to and including the mobile station number (MSISDN) of the requesting user device to the telecommunications system. This mobile station number is then used by the user device which is the subject of the request to identify the requester to the user of the subject user device when the user is asked to authorize any presence notification subscription request.

The signed presence subscription mechanism may typically be used by a user device to attempt to subscribe to the presence information of all RCS user devices discovered on initial start of the user device, and will then be refreshed periodically.

RCS telecommunications systems may also include an anonymous subscription mechanism which can be sent from an originating user device to determine whether a terminating user device can be contacted via Internet Protocol (IP) without identifying the originating user device. The anonymous subscription mechanism is not used in the present invention since the message does not include the identity of the originating device, that is, it is anonymous. Accordingly, in the description below the wording presence subscription mechanism or presence subscription message refers to a signed presence subscription mechanism and signed presence subscription messages respectively.

RCS telecommunications systems including capabilities exchange mechanisms and presence subscription mechanisms are well known to the skilled person in the technical field of the present invention. Accordingly, the capabilities exchange mechanism and presence subscription mechanism are only described in general terms herein, and not in detail.

In operation of the first telecommunications network 1, as a result of the routine operations of the capabilities exchange mechanism and the presence subscription mechanism the first telecommunications network 1 will receive capabilities exchange request messages and presence notification subscription request messages from user devices of other remote telecommunications networks.

In FIG. 1, a second, remote, telecommunications network 8 is connected to the first telecommunications network 1 through a first point of interconnect component 7a. A first user device 9 is provided with RCS telecommunications services by the first telecommunications network 1, and a second user device 10 is provided with RCS telecommunications services by the second telecommunications network 8.

When, as a part of the operation of the capabilities exchange mechanism, the second user device 10 acting as an originating device sends a capabilities exchange request message to the first user device 9, the capabilities exchange request message is sent from the second user device 10 to the second telecommunications network 8, as indicated by arrow 11a. The capabilities exchange request message is then sent by the second telecommunications network 8 to the first telecommunications network 1, where the message is received by the first point of interconnect component 7a, as indicated by the arrow 11b. The first point of interconnect component 7a then sends the capabilities exchange request message to the interconnect service border gateway component 6, as indicated by the arrow 11c, which in turn sends the capabilities exchange request message to the multimedia service platform 3, as indicated by the arrow 11d.

The multimedia service platform 3 then extracts the identity of the first user device 9 from the capabilities exchange request message and retrieves any necessary data regarding the first user device 9 from the local user database 4. The multimedia service platform 3 then uses the retrieved data to forward the capabilities exchange request message through the first telecommunications network 1 to the first user device 9, as indicated by the arrow 11e.

When, as a part of the operation of the presence subscription mechanism, the second user device 10 sends a presence notification subscription request message to subscribe to presence information regarding the first user device 9, the presence notification subscription request message is sent from the second user device 10 to the first user device 9 as indicated by arrows 11a to 11e in a similar manner to a capabilities exchange request message.

Figure 2:
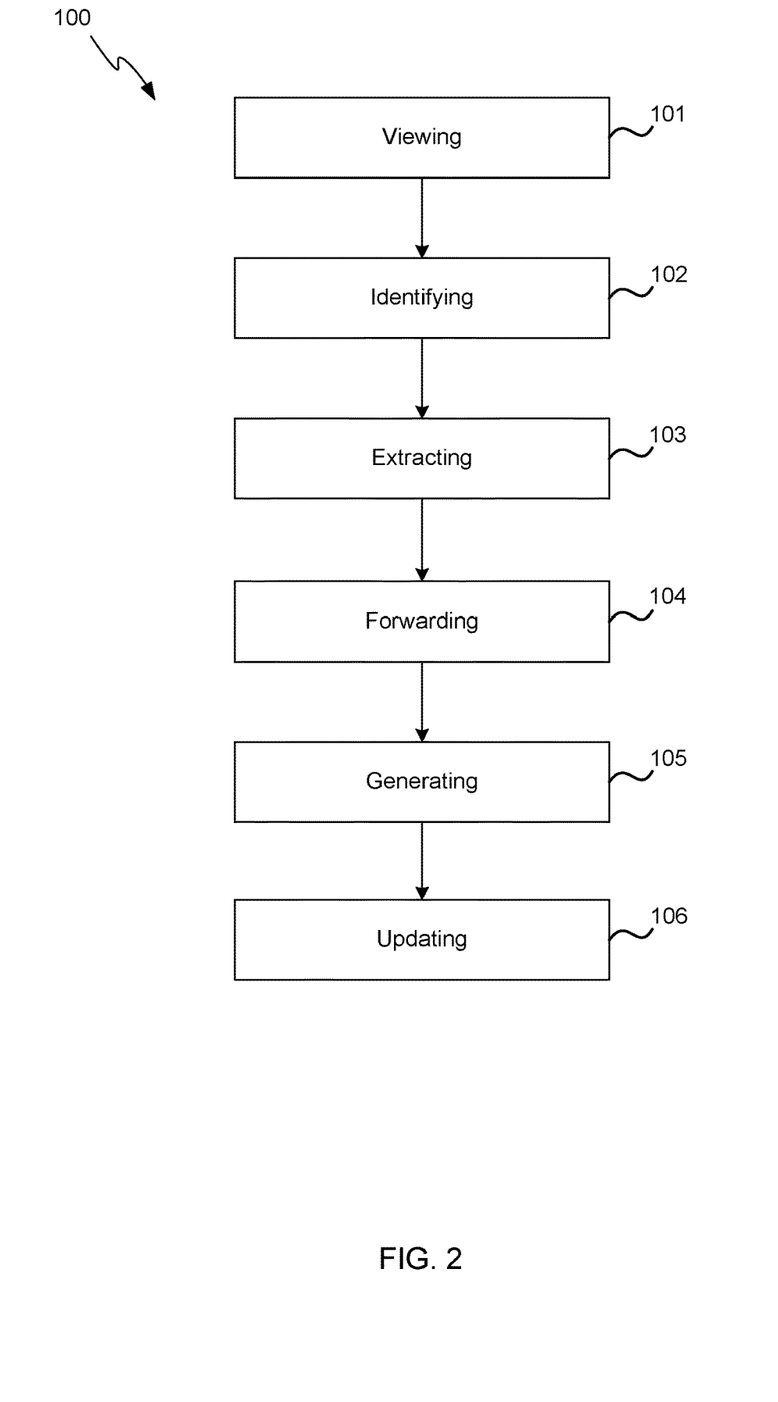
FIG. 2 is a flow diagram of a method for obtaining and storing routing information which may be used by the apparatus of FIG. 1.

In the first embodiment as illustrated in FIG. 1, the routing information system 2 comprises a traffic analyzer 20, a routing database provisioning component 21 and a routing database 22. An example of a method of operation 100 of the routing information system 2 is shown in FIG. 2.

The traffic analyzer 20 is connected to the point of interconnect components 7a to 7n and is arranged to passively view and analyses incoming telecommunications traffic passing through the point of interconnect components 7a to 7n in a viewing step 101. The viewing by the traffic analyzer 20 is described as passive because the traffic analyzer does not interfere with the normal processing and forwarding of the incoming telecommunications traffic by the point of interconnect components 7a to 7n.

The traffic analyzer 20 is arranged to identify any capabilities exchange request messages and presence notification subscription request messages in the viewed incoming telecommunications traffic in an identifying step 102. When a capabilities exchange request message or a presence notification subscription request message is identified a number extractor component of the traffic analyzer 20 extracts the mobile station number (MSISDN) of the originating or requesting user device from the message, and a routing data component of the traffic analyzer 20 obtains the identity of the point of interconnect in which the message was identified, in an extracting step 103. The traffic analyzer 20 then forwards the extracted mobile station number together with the identity of the point of interconnect in which the message was identified to the routing database provisioning component 21 in a forwarding step 104.

The routing database provisioning component 21 generates a current association record stating that the extracted mobile station number is associated with the identified point of interconnect in a generating step 105.

The routing database provisioning component 21 then uses the generated current association record to update the routing database 22 in an updating step 106. In the updating step 106, if there is no existing association record for the extracted mobile station number in the routing database 22, the routing database is updated by storing the current association record as a new record. If there is an existing record for the extracted mobile station number in the routing database 22 which differs from the current association record, the routing database is updated by storing the current association record as an update of the existing record. If there is an existing record for the extracted mobile station number in the routing database 22 which is the same as the current association record, the updating does not change the existing record.

A specific example of the operation of the routing information system 2 will now be described with reference to FIG. 1.

When, as a part of the operation of the capabilities exchange mechanism, the second user device 10 acting as an originating device sends a capabilities exchange request message to the first user device 9, the capabilities exchange request message is sent by the second telecommunications network 8 to the first telecommunications network 1, where the message is received by the first point of interconnect component 7a, as indicated by the arrow 11b.

The traffic analyzer 20 views the incoming telecommunications traffic passing through the point of interconnect components 7a to 7n in the viewing step 101, and identifies the capabilities exchange request message from the second user device 10 in the identifying step 102. The traffic analyzer 20 then extracts the mobile station number of the originating second user device 10 in the extracting step 103. The traffic analyzer 20 then forwards the mobile station number of the originating second user device 10 together with the identity of the first point of interconnect 7a to the routing database provisioning component 21 in the forwarding step 104.

The routing database provisioning component 21 generates a current association record for the mobile number of the second user device 10, in the generating step 105. The generated current association record indicates that the mobile station number of the second user device 10 is associated with the first point of interconnect component 7a.

The routing database provisioning component 21 then uses the generated current association record to update the record for the mobile number of the second user device 10 in the routing database 22 in the updating step 106.

A presence notification subscription request message from the second user device 10 would be processed in a corresponding manner.

As the routing information system 2 continues to carry out the method 100, over a period of time the data stored in the routing database 22 will accumulate to form an up to date set of routing data in the routing database 22 for all, or substantially all, mobile user devices in contact with mobile user devices of the first telecommunications network 1.

This set of routing data can them be used by the first telecommunications network 1 to carry out routing of telecommunications traffic without having to rely on other parties to provide routing information or carry out the routing, and without incurring the cost, technical complexity and difficulty of integrating multiple databases belonging to different mobile network operators and/or third party operators.

The first embodiment of the invention described above generates entries for a routing database by using both capabilities exchange request messages and presence notification subscription request messages. In alternative examples only one of these messages types may be used. In principle either of these message types may be used.

The use of capabilities exchange request messages and/or presence notification subscription request messages has the advantage that these messages are already being sent in the normal operation of the telecommunications network, so that the present invention does not impose any additional traffic overhead on the telecommunications system.

In other embodiments other types of message may be used provided that these messages include an identifier of an originating user device on an interconnected remote network. Usually this identifier will be the mobile station number of the originating user device, but this is not essential.

An example of the use of the routing database 22 according to the first embodiment to route outbound traffic will now be described with reference to FIG. 3.

Figure 3:
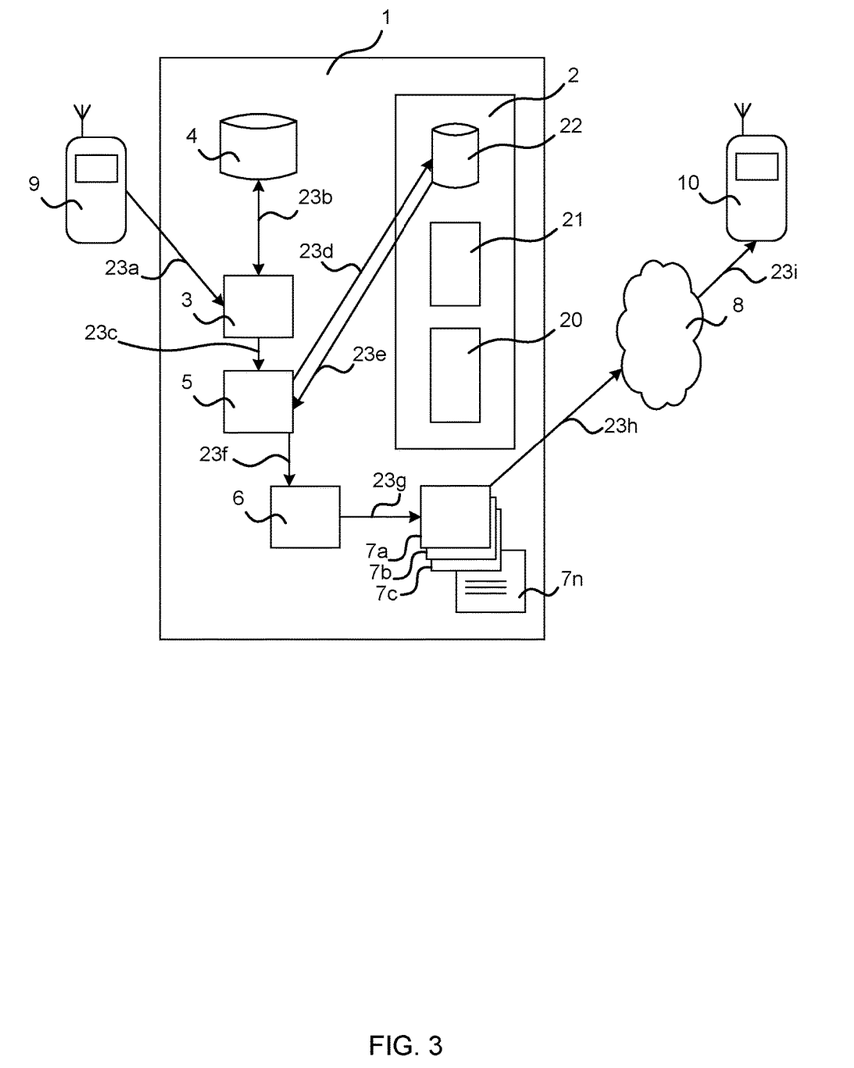
FIG. 3 is a schematic diagram showing a first example of use of stored routing information according to a first embodiment of the present invention.

FIG. 3 shows the first telecommunications network 1. As in FIG. 1, the first telecommunications network 1 comprises a multimedia service platform 3, a local user database 4, a border gateway control component 5, an interconnect service border gateway component 6, a number of point of interconnect components 7a to 7n, and a routing information system 2 comprising a traffic analyzer 20, a routing database provisioning component 21 and a routing database 22.

When the first user device 9 attempts to communicate with the second user device 10 using RCS telecommunications, the first user device 9 sends a communication request message including the mobile station number of the second user device 10 through the first telecommunications network 1 to the multimedia service platform 3, as indicated by the arrow 23a. The multimedia service platform 3 then queries the local users database 4 to confirm whether the second user device 10 is a customer of the first telecommunications network 1 provisioned in the local user database 4, as indicated by the arrow 23b.

If the second user device 10 was a customer of the first telecommunications network 1 provisioned in the local user database 4 the first telecommunications network 1 would be able to contact the second user device 10 directly without any interconnect to another telecommunications network being required.

However, in the illustrated example the second user device 10 is not provisioned in the local user database 4. Accordingly, when this has been confirmed the multimedia service platform 3 sends the request to the border gateway control component 5, as indicated by the arrow 23c. The border gateway control component 5 then queries the routing database 22 to identify any association record for the mobile station number of the second user device 10, indicated by the arrow 23d.

If there is an association record for the mobile station number of the second user device 10 in the routing database 22, the routing database 22 returns data identifying which of the points of interconnect 7a to 7n should be used to route telecommunications traffic to the second user device 10 to the border gateway control component 5, as indicated by the arrow 23e. In this example the returned data will indicate that the first point of interconnection 7a should be used.

The border gateway control component 5 then adds routing information to the message which indicates the correct point of interconnection 7a to 7n is to be used, in this example the first point of interconnection 7a, and then sends the message to the service border gateway component 6, as indicated by the arrow 23f.

The border gateway component 6 reads the routing information and routes the message to the indicated point of interconnection 7a to 7n, in this example the first point of interconnection 7a, as indicated by the arrow 23g.

The point of interconnection then sends the message to the respective telecommunications network to which the point of interconnection is connected, and this telecommunications network sends the message to the destination user device. In this example the first point of interconnection 7a sends the message to the second telecommunications network 8, as indicated by the arrow 23h, and the second telecommunications network 8 sends the message to the second user device 10, as indicated by the arrow 23i.

If the routing database 22 does not contain any association record for the mobile station number of the second user device 10, the first telecommunications network 1 can follow its usual procedure for unresolved traffic, for example returning an error message to the first user device 9.

An alternative example of the use of the routing database 22 according to the first embodiment to route outbound traffic will now be described with reference to FIG. 4.

Figure 4:
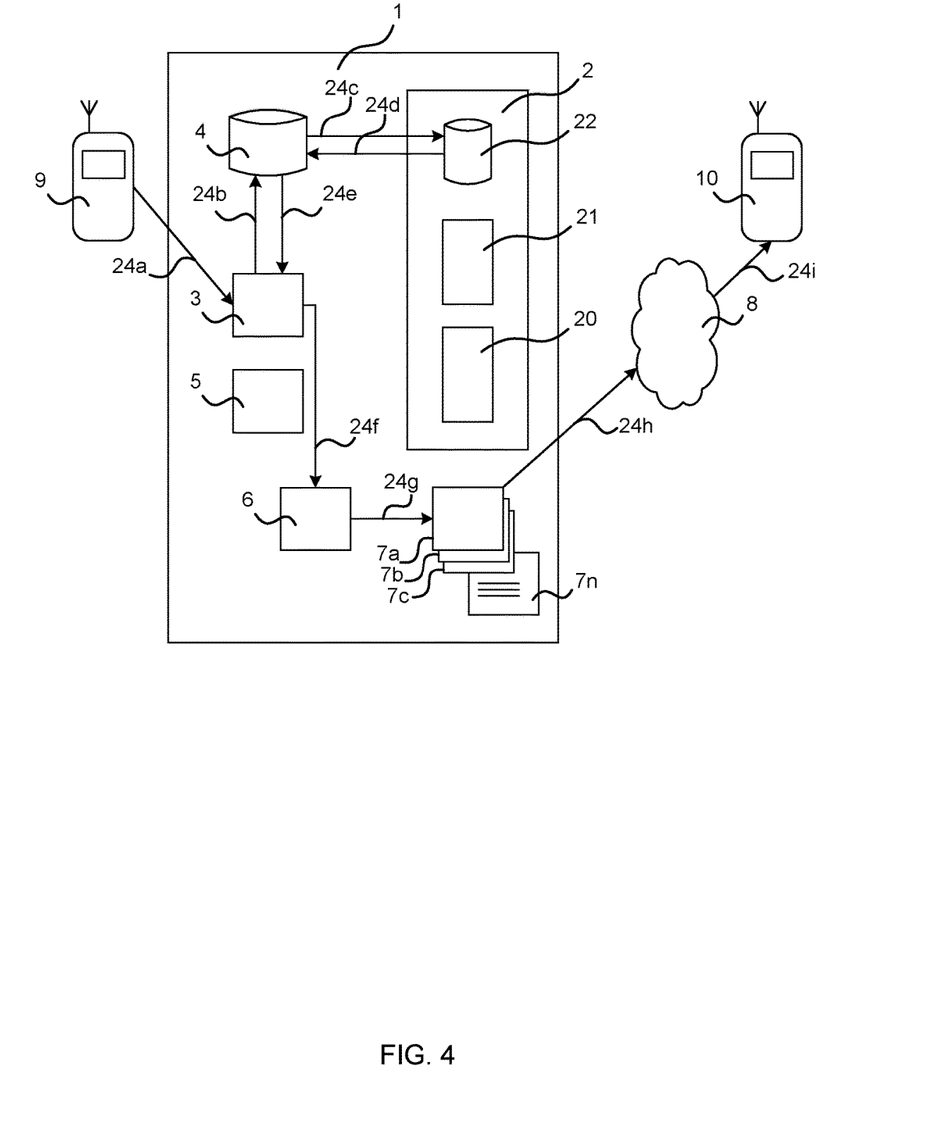
FIG. 4 is a schematic diagram showing a second example of use of stored routing information according to a first embodiment of the present invention.

FIG. 4 shows the first telecommunications network 1, which comprises the same components as in the example of FIG. 3.

In the example of FIG. 4, when the first user device 9 attempts to communicate with the second user device 10 using RCS telecommunications, the first user device 9 sends a communication request message including the mobile station number of the second user device 10 through the first telecommunications network 1 to the multimedia service platform 3, as indicated by the arrow 24a. The multimedia service platform 3 then queries the local user database 4 to confirm whether the second user device 10 is a customer of the first telecommunications network 1 provisioned in the local user database 4, as indicated by the arrow 24b. Similarly to the example of FIG. 3, if the second user device 10 was a customer of the first telecommunications network 1 provisioned in the local user database 4 the first telecommunications network 1 would be able to contact the second user device 10 directly without any interconnect to another telecommunications network being required.

However, in the illustrated example the second user device 10 is not provisioned in the local user database 4. Accordingly, the local user database 4 then queries the routing database 22 to identify any association record for the mobile station number of the second user device 10, indicated by the arrow 24c.

If there is an association record for the mobile station number of the second user device 10 in the routing database 22, the routing database 22 returns data identifying which of the points of interconnect 7a to 7n should be used to route telecommunications traffic to the second user device 10 to the local user database 4, as indicated by the arrow 24d. The local user database 4 then sends this data to the multimedia service platform 3, as indicated by the arrow 24e. In this example the returned data will indicate that the first point of interconnection 7a should be used.

The multimedia service platform 3 then adds routing information to the message which indicates the correct point of interconnection 7a to 7n is to be used, in this example the first point of interconnection 7a, and then sends the message to the service border gateway component 6, as indicated by the arrow 24f.

The border gateway component 6 reads the routing information and routes the message to the indicated point of interconnection 7a to 7n, in this example the first point of interconnection 7a, as indicated by the arrow 24g.

The point of interconnection then sends the message to the respective telecommunications network to which the point of interconnection is connected, and this telecommunications network sends the message to the destination user device, as in the previous example. In this example the first point of interconnection 7a sends the message to the second telecommunications network 8, as indicated by the arrow 24h, and the second telecommunications network 8 sends the message to the second user device 10, as indicated by the arrow 24i.

As in the previous example, if the routing database 22 does not contain any association record for the mobile station number of the second user device 10, the first telecommunications network 1 can follow its usual procedure for unresolved traffic.

The examples of use of the routing database 22 set out above relate to the sending of a message, the routing database 22 can be used in a similar manner to send any other type of telecommunications traffic.

An improved routing information system according to a second embodiment of the present invention will now be described with reference to FIG. 5.

The routing information system according to the second embodiment is based upon the routing information system according to the first embodiment, but with additional functionality.

Figure 5:
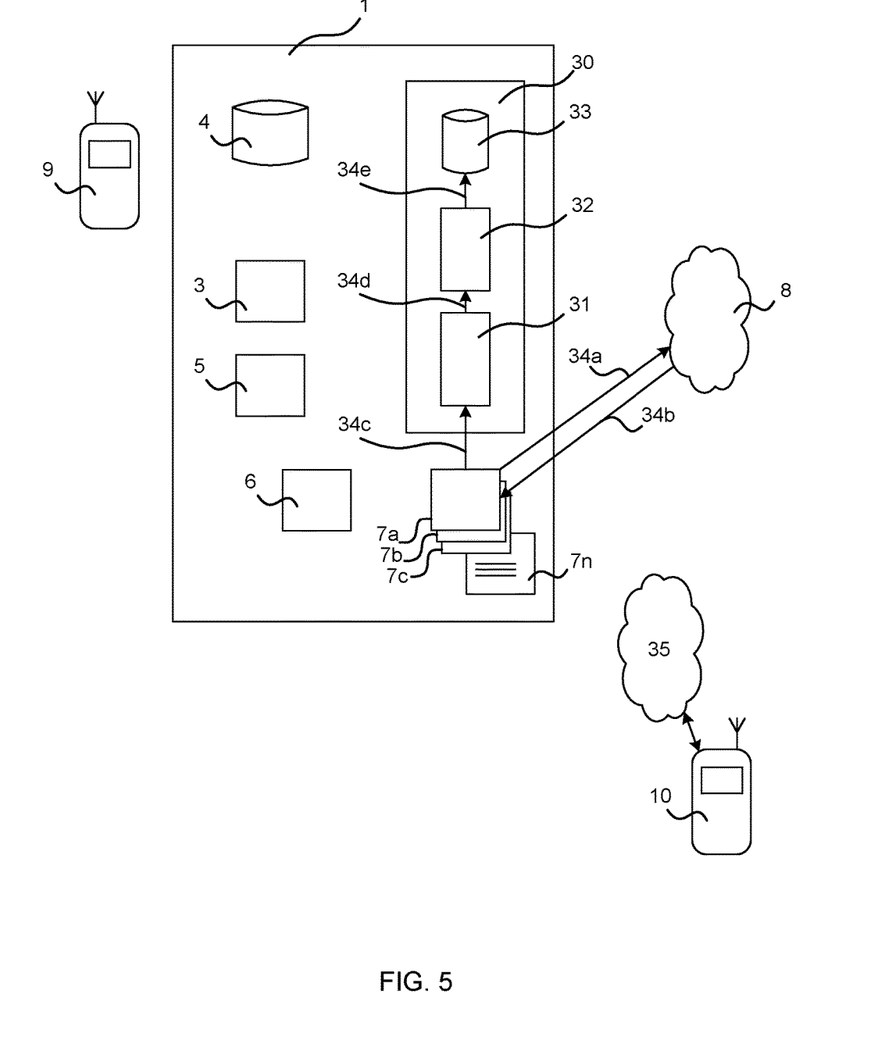
FIG. 5 is a schematic diagram of an apparatus for obtaining and storing routing information according to a second embodiment of the present invention.

In the second embodiment illustrated in FIG. 5, the first telecommunications network 1 comprises a routing information system 30 instead of the routing information system 2, the other components of the first telecommunications network 1 are the same as in the first embodiment illustrated in FIG. 1.

The routing information system 30 comprises a traffic analyzer 31, a routing database provisioning component 32, and routing database 33. These have the same functionality as the traffic analyzer 20, a routing database provisioning component 21, and routing database 22 of the first embodiment, and also have some additional functionality, as will be explained below.

In operation of the first telecommunications network 1 comprising the routing information system 30 it may occur that a mobile station number for which there is an association record stored in the routing database 33 is migrated from one mobile network operator to another, so that the telecommunications network providing RCS telecommunications services to that mobile station number changes.

In this situation, when the first telecommunications network 1 attempts to send telecommunications traffic to a user device having the mobile station number based on the association record stored in the routing database 33 the telecommunications traffic will be routed to the incorrect telecommunications network, and this incorrect telecommunications network will return a "user not found" error message indicating that this mobile station number cannot be found.

In the example illustrated in FIG. 5, the first telecommunications network 1 has routed telecommunications traffic intended to be sent to the second user device 10 through the first point of interconnection 7a to the second telecommunications network 8, as indicated by an arrow 34a. This routing being based on an association record for the second user device 10 stored in the routing database 33. This may for example have been done in the manners of the examples of use shown in FIG. 3 or FIG. 4.

However, the second user device has been migrated from the second telecommunications network 8 to a third telecommunications network 35. Accordingly, the second telecommunications network 8 is unable to send the telecommunications traffic to the second user device 10, and the second telecommunications network 8 returns a "user not found" error message indicating that the second user device cannot be found to the first point of interconnection 7a of the first telecommunications network 1, as indicated by the arrow 34b.

The traffic analyzer 31 is arranged to identify error messages of this type in the viewed incoming telecommunications traffic. When the error message is identified the traffic analyzer 31 extracts the mobile station number of the second user device 10 from the error message, as indicated by the arrow 34c, and then forwards the extracted mobile station number to the routing database provisioning component 32, as indicated by the arrow 34d.

The routing database provisioning component 32 then sends an instruction to delete the association record for the second user device 10 to the routing database 33, as indicted by the arrow 34e, and the routing database 33 deletes this association record.

The first telecommunications network 1 may further respond to the "user not found" error message by sending capabilities exchange requests to other interconnected telecommunications networks through their respective points of interconnect. This is a known feature of RCS telecommunications services referred to as sequential search or serial forking.

In cases where one of the interconnected telecommunications networks, in this example the third telecommunications network 35, responds with a "user found" message indicating that the telecommunications network is the owner of the mobile station number of the second user device 10, this "user found" message may be identified by the traffic analyzer 31 and used by the routing information system 30 to store a new association record for the mobile station number of the second user device 10 in the routing database 33 in a similar manner to a capabilities exchange request message or a presence notification subscription request message.

In one example the traffic analyzer may be implemented as a part of each of the point of interface components. Where the point of interface component is an IP layer 2 switch with a port mirroring interface. Port mirroring interface is a common functionality of IP layer 2 switches that copies all traffic to a separate Ethernet interface, and can be used for traffic monitoring purposes. The traffic analyzer should implement protocol parsers able to understand protocols used for capabilities exchange, for example the session initiation protocol OPTIONS request.

In one example the traffic analyzer may have the functionality to detect an incoming capabilities exchange request from a remote operator and a mobile number and to respond by sending a request to the routing database provisioning component containing: the type of event, the association detected, and the parameters of the mobile number from the capabilities exchange request and an identifier of the remote operator associated with the point of interconnect carrying the capabilities exchange request. The traffic analyzer may have the functionality to detect a 200 OK response with capability tags to an outgoing capabilities exchange request from the local operator to a remote operator and a mobile number and to respond by sending a request to the routing database provisioning component containing: the type of event, the association detected, and the parameters of the mobile number from the capabilities exchange To parameter, and an identifier of the remote operator associated with the point of interconnect carrying the response. The traffic analyzer may have the functionality to detect an empty 200 OK response or 404 Not Found response to an outgoing capabilities exchange request from the local operator to a remote operator and a mobile number and to respond by sending a request to the routing database provisioning component containing: the type of event user not found detected, and the parameters of the mobile number from the capabilities exchange To parameter, and an identifier of the remote operator associated with the point of interconnect carrying the response.

In one example the routing database provisioning component may have the functionality to receive requests from the traffic analyzer and to update associations in a routing database standby instance depending on the type of event in the request. The routing database provisioning component may have the functionality to respond to the event association detected by checking the current association for the mobile number in the request, and if an association does not exist or is associated with an operator with a predefined priority lower than the predefined priority of the remote operator in the request, then updating the record with a new association and setting the association refresh timestamp to the current time, and recording the change in the delta log, or, if an association does exist and is associated with an operator with a predefined priority higher than the predefined priority of the remote operator in the request, not modifying the association. The routing database provisioning component may have the functionality to respond to the event user not found detected by checking the current association for the mobile number in the request, and if an association does not exist or is associated with an operator different from the remote operator in the request, then not taking any action, or, if an association does exist and is associated with the same operator as the remote operator in the request, removing the association, and recording the change in the delta log.

In one example the routing database provisioning component may be able to buffer operations requested to the routing database if they are confirmed by the routing database in order to allow the routing database to perform all read and update requests regardless of the internal database switchovers described below.

In some examples the routing database provisioning component may also have further functionality to carry out the optional features described in the present application.

The routing database provides a database of associations between mobile numbers and interconnected remote operators. In one example the routing database may implement an ENUM interface, as commonly used in telecommunications routing systems to resolve mobile numbers to routable destination addresses. The database may be implemented using two identical instances, which change roles, so that at any point in time one is in active and the other is in standby mode, in order to improve performance and reliability. The operations performed by the database instances in each mode may include: the active instance responding to ENUM queries from the IP multimedia service platform component responsible for locating a destination network using a Call Session Control Function or Border Gateway Control Function, depending on the IP multimedia service platform implementation; the passive instance immediately after being switched to backup mode performing all change operations recorded in the delta log of the previously passive node, accepting read and update requests from the routing database provisioning component, confirming to the routing database provisioning component if provisioning requests were executed correctly or not, and maintaining a new delta log with all changes performed while in passive mode. Periodically, for example every 15 minutes, the currently active instance may be switched to standby mode, and at the same time the standby instance may be switched to active mode.

In one example, at switchover the routing database may switch both instances to active mode for short period of time significantly longer than the longest possible switchover lag to eliminate any risk that active node is not available at any time due to switchover lag. In this example, during this short period of time there would be no standby node able to accept update requests from the routing database provisioning component, and for this reason the routing database provisioning component should store in the buffer all update operations that were not confirmed and retry them until they are confirmed or time out.

There are a number of optional features which may be added to the present invention in order to improve the accuracy and completeness of the routing data in the routing database.

Optionally, in some examples, the routing database may be initially populated with association records based on the number ranges of mobile station numbers issued to different mobile network operators. In such examples, when it was attempted to contact mobile station numbers which have not yet been provisioned to the routing database by the methods described herein, the routing database will still contain an association record associating the mobile station number with the point of interconnect for the mobile network operator which originally owned the mobile station number. If this routing data is used and the mobile network operator which originally owned the mobile station number cannot find the mobile station number it will return a "user not found" message. The serial forking process and subsequent steps as discussed above can then be used to update the association record for the mobile station number.

Optionally, in some examples, all of the association records in the routing database relating to a particular telecommunications network may be may be updated using information provided by the network operator. In some examples this may be done periodically. In some examples this may be done for one, some or all interconnected telecommunications networks. This will require the agreement and cooperation of the relevant network operator(s).

Optionally, in some examples, the association records in the routing database may have a validity period that would be refreshed each time the traffic analyzer detects suitable incoming telecommunications traffic to generate a corresponding new current association record. Association records which are not refreshed before their validity period expires would not be used, and may optionally be deleted.

Optionally, in some examples, all association records related to one or more interconnected telecommunications networks may be periodically removed. The association records for these telecommunications networks would then be repopulated over time by the methods described above. This may allow incorrect association records to be purged from the routing database.

In the embodiments described above the invention is used in a first telecommunications network interconnected to other telecommunications networks operated by mobile network operators. In some examples the invention may be used in a telecommunications network which is interconnected both to other telecommunications networks operated by mobile network operators and to secondary points of interest who are not mobile network operators, but who provide telecommunications services to mobile station numbers owned by the mobile network operators.

In the embodiments described above the use of a routing database is described. In alternative examples other forms of data store may be used instead of a database.

In the present invention a mobile network operator may be regarded as owning mobile station numbers, while secondary points of interest do not own mobile station numbers. Mobile network operators are operators who have been issued blocks of mobile station numbers by a regulator.

In these examples the mobile network operator of the first mobile telecommunications network may perceive a conflict where a particular mobile station number may be provisioned with services both by a mobile network operator and a secondary point of interest. In this situation the present invention may identify a single mobile station number as being found in two different interconnected telecommunications networks, one being the network of the mobile network operator and the other being the network of the secondary point of interest.

In order to resolve these conflicts the routing information system according to the present invention may be further provided with a conflict resolution mechanism.

Where a conflict resolution mechanism is provided each mobile network operator and secondary point of interest operating a telecommunications network interconnected to the first telecommunications network is assigned a priority. Preferably, the assigned priorities reflect the interconnect agreements reached with the operators of the different interconnected telecommunications networks in a given country. However, this is not essential and the priorities may be assigned arbitrarily in any manner preferred by the operator of the first telecommunications network. Each operator of an interconnected telecommunications networks should be assigned a different priority.

In some examples the assigned priorities may be configurable to reflect any changes in the relationships and agreements between the different operators.

Preferably, mobile network operators are assigned higher priorities and secondary points of interest are assigned lower priorities.

Figure 6:
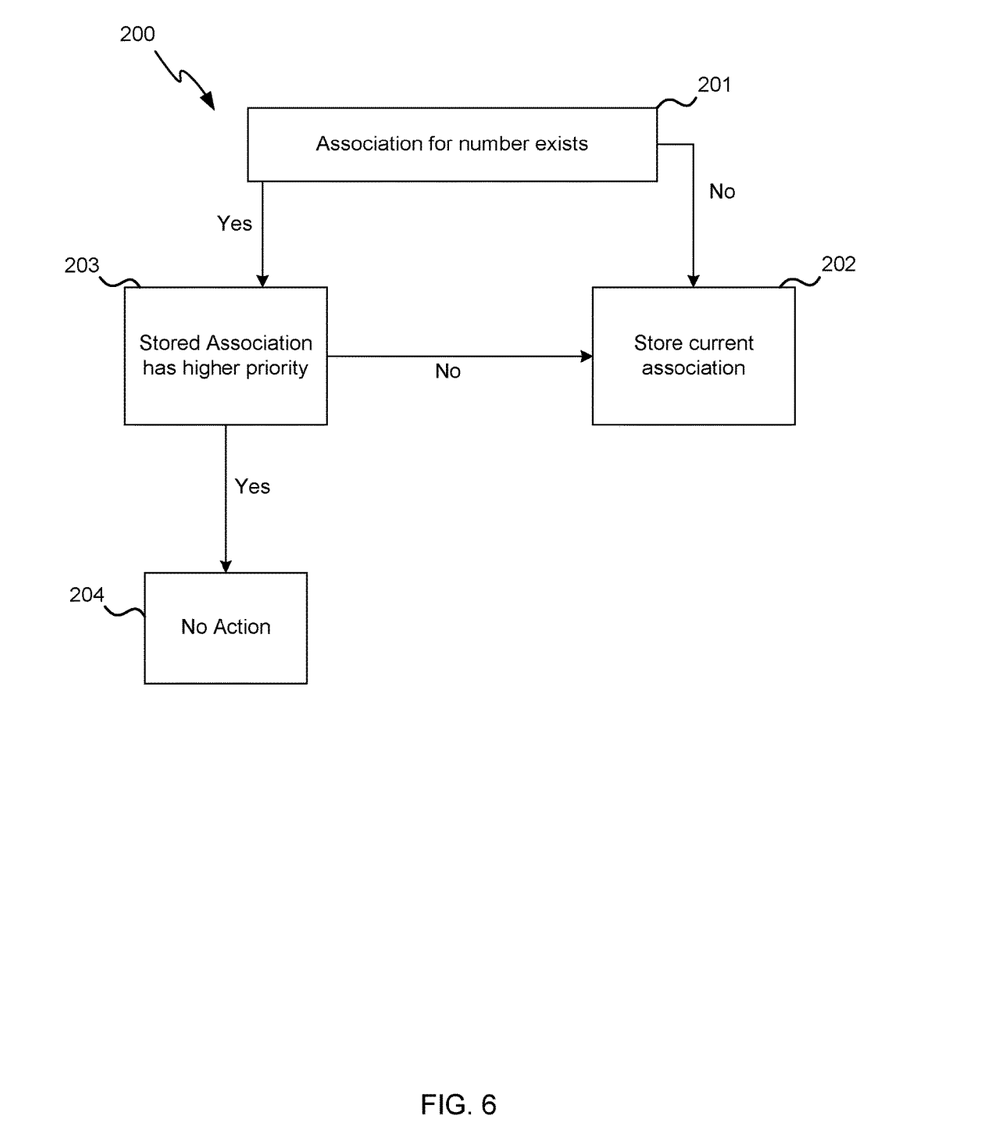
FIG. 6 is a flow diagram of a conflict resolution method according to the present invention.

The conflict resolution mechanism of the routing information system 2 carries out a conflict resolution method as shown in the flow chart 200 of FIG. 6. In this example each association record additionally includes the assigned priority of the operator of the telecommunication network on which the mobile station number was identified.

In a first step 201, when a current association record is generated for a mobile station number, the conflict resolution mechanism determines whether an association record for that mobile station number for a different operator is already stored in the routing database 22.

If no association record for a different operator is stored in the routing database 22, the method moves to step 202 and the generated current association record is stored in the routing database 22.

If an association record for a different operator is stored in the routing database 22 the method moves to step 203 and the priorities of the current and stored association records are compared to determine if the stored association record has a higher priority than the current association record.

If the stored association record does have a higher priority than the current association record the method moves to step 204 and ends the method without taking any action. Accordingly, the stored association record is retained without change.

If the stored association record does not have a higher priority than the current association record the method moves to step 202 and the generated current association record is stored in the routing database 22. Accordingly, the stored association record is replaced by the newly generated current association record.

This conflict resolution method ensures that association records relating to the higher priority operators are retained in cases of conflict. Accordingly, the method may be used to ensure that association records relating to mobile network operators are retained in preference to association records relating to secondary points of interest.

In the embodiments described above routing is carried out from the first telecommunications network to other telecommunications networks interconnected directly to the first telecommunications network. In some implementations telecommunications networks may be linked to a telecommunications network employing the present invention through one or more communications hubs or aggregators, so that the present invention may only be able to identify or derive the routing to the intermediating communications hub or aggregator and not to the telecommunications networks themselves. However, in such implementations it is sufficient to provide routing to the intermediating communications hub or aggregator only, the intermediating communications hub or aggregator will be able to complete the routing to the telecommunications networks.

In the embodiments described above each remote network is associated with one point of interconnect. In other examples there may be more than one point of interconnect associated with a remote network.

In the embodiments described above the association record comprises data identifying which point of interconnect is associated with a mobile station number, and this point of interconnect is used to route telecommunications traffic to the mobile station number. In other examples the association record may comprise alternative data which can be used to route telecommunications traffic. For example the association record may comprise the identity of the telecommunications network from which the mobile station number has been received.

In the embodiments described above the routing data for a mobile user device is deduced from the identity of the point of interconnect carrying messages from the mobile user device. In other examples the routing data may be obtained in different ways, provided that the routing data can be unambiguously derived. For example, the routing data for a mobile user device may be derived from signals parameters of the messages. There are many different ways in which the routing data may be derived from telecommunications traffic from a mobile user device, as will be understood by the person skilled in the art.

In the described embodiments the components may be hardware components or logical components such as software modules or elements.

In the illustrated embodiments of the invention the routing information system 2, 30 may be implemented as any form of a computing and/or electronic device.

The computing-based device 2, 30 comprises one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

The computer executable instructions may be provided using any computer-readable media that is accessible by computing based device 2, 30. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Although the database 22, 33 is shown within the computing-based device 2, 30 it will be appreciated that the database 2, 30 may be distributed or located remotely and accessed via a network or other communication link (e.g. using a communication interface).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of routing network traffic between a first telecommunications network and a second telecommunications network, each telecommunications network providing Internet Protocol "IP" communications based on a mobile station number "MSISDN", the method comprising the steps of:
   at the first telecommunications network, analyzing incoming telecommunications traffic to identify a capabilities request or response message or presence information update message that was transmitted from the second telecommunications network, which capabilities request or response message or presence information update message includes a mobile station number;
   when such capabilities request or response message or presence information update message is identified:
      extracting the mobile station number from the identified capabilities request or response message or presence information update message;
      obtaining routing data for the second telecommunications network;
      storing the extracted mobile station number in association with the obtained routing data; and
      determining an assigned priority for the second telecommunications network;
   if the extracted mobile station number has already been stored in association with routing data:
      comparing the already stored routing data associated with the mobile number to the obtained routing data; and
      comparing a predetermined priority of a particular telecommunications network identified by the already stored routing data to a predetermined priority of the second telecommunications network from which the message was received; and
   if the already stored routing data is different from the obtained routing data, performing either:
      if the predetermined priority of the particular telecommunications network identified by the already stored routing data is lower than the predetermined priority of the second telecommunications network from which the message was received, replacing the stored routing data with the obtained routing data, or
      if the predetermined priority of the particular telecommunications network identified by the already stored routing data is higher than the predetermined priority of the second telecommunications network from which the message was received, not replacing the stored routing data with the obtained routing data.

2. The method according to claim 1, wherein the IP communications based on MSISDN are Rich Communications Suite "RCS" services.

3. The method according to claim 1, wherein the identified capabilities request or response message or presence information update message comprises a capabilities exchange request message.

4. The method according to claim 1, wherein the identified capabilities request or response message or presence information update message comprises a presence notification subscription request message.

5. The method according to claim 1, wherein the identified capabilities request or response message or presence information update message comprises a user found message.

6. The method according to claim 1, wherein the stored routing data identifies a point of interconnect through which the identified capabilities request or response message or presence information update message passed.

7. The method according to claim 1, wherein the stored routing data identifies the second telecommunications network.

8. The method according to claim 1, further comprising:
   if the extracted mobile station number has already been stored in association with routing data, comparing the already stored routing data associated with the mobile number to the obtained routing data; and
   if the already stored routing data is different from the obtained routing data, replacing the stored routing data with the obtained routing data.

9. The method according to claim 8, and further comprising the steps of:
   at the first telecommunications network, analyzing incoming telecommunications traffic to identify "user not found" error messages; and,
   when such a message is identified:
      extracting the mobile station number from the identified error message or from the message the error message has been sent in response to; and
      deleting any stored copy of the extracted mobile station number and the associated routing data.

10. The method according to claim 1, wherein a plurality of capabilities requests or response messages or presence information update messages are identified and each corresponding extracted mobile station number is stored in association with respective routing data in a database.

11. The method according to claim 1, further comprising:
   sending a message to a mobile station number, the message being sent with a routing based on routing data previously stored in association with the mobile station number.

12. An apparatus for routing network traffic between a first telecommunications network and a second telecommunications network, each telecommunications network providing Internet Protocol "IP" communications based on mobile station numbers "MSISDN", the apparatus comprising:
   an analyzer arranged to analyze incoming telecommunications traffic at the first telecommunications network to identify a capabilities request or response message or presence information update message from the second telecommunications network, which capabilities request or response message or presence information update message includes a mobile station number, wherein the analyzer is further configured to determine an assigned priority for the second telecommunications network;
a number extractor arranged to extract the mobile station number from the identified capabilities request or response message or presence information update message;
a routing data component arranged to obtain routing data for the second telecommunications network; and
a data store for storing said extracted mobile station number in association with said obtained routing data, wherein the apparatus is configured to:
if the extracted mobile station number has already been stored in association with routing data;
comparing the already stored routing data associated with the mobile number to the obtained routing data; and
comparing a predetermined priority of a particular telecommunications network identified by the already stored routing data to the assigned priority of the second telecommunications network from which the message was received; and
if the already stored routing data is different from the obtained routing data, performing either:
if the predetermined priority of the particular telecommunications network identified by the already stored routing data is lower than the assigned priority of the second telecommunications network from which the message was received, replacing the stored routing data with the obtained routing data; or
if the predetermined priority of the particular telecommunications network identified by the already stored routing data is higher than the assigned priority of the second telecommunications network from which the message was received, not replacing the stored routing data with the obtained routing data.

13. The apparatus according to claim 12, wherein the IP communications based on MSISDN are Rich Communications Suite "RCS" services.

14. The apparatus according to claim 12, wherein the identified capabilities request or response message or presence information update message comprises a capabilities exchange request message.

15. The apparatus according to claim 12, wherein the identified capabilities request or response message or presence information update message comprises a presence notification subscription request message.

16. The apparatus according to claim 12, wherein the identified capabilities request or response message or presence information update message comprises a user found message.

17. The apparatus according to claim 12, wherein the stored routing data identifies a point of interconnect through which the identified capabilities request or response message or presence information update message passed.

18. The apparatus according to claim 12, wherein the stored routing data identifies the second telecommunications network.

19. The apparatus according to claim 12, further comprising:
a database provisioning component arranged to, if the extracted mobile station number has already been stored in association with routing data, compare the already stored routing data associated with the mobile number to the obtained routing data; and
if the already stored routing data is different from the obtained routing data, replace the stored routing data with the obtained routing data.

20. The apparatus according to claim 12, wherein the apparatus is arranged to identify a plurality of capabilities requests or response messages or presence information update messages and to store each corresponding extracted mobile station number in association with respective routing data in a database.

21. A telecommunications network providing Internet Protocol "IP" communications based on mobile station number "MSISDN", the network comprising an apparatus for automatically gathering routing information according claim 12 and further comprising:
a routing component arranged to control the routing of a message sent to a mobile station number, so that the message is sent with a routing based on routing data stored in association with the mobile station number in the data store.

22. The apparatus of claim 12, wherein the analyzer is a passive analyzer such that the analyzer passively analyzes the incoming telecommunications traffic.

23. The apparatus of claim 12, wherein the assigned priority is usable by the first telecommunications network to determine an update availability for an association record related to the mobile station number, and wherein, based on the assigned priority, the association record is either updated or created, the association record including the mobile station number and the obtained routing data.

24. A method of automatically gathering routing information in a telecommunications network providing Internet Protocol "IP" communications based on mobile station number "MSISDN", the method comprising the steps of:
analyzing incoming telecommunications traffic to identify a capabilities request or response message or presence information update message from other telecommunications networks, which capabilities request or response message or presence information update message includes a mobile station number;
when such capabilities request or response message or presence information update message is identified:
extracting the mobile station number from the identified capabilities request or response message or presence information update message;
obtaining routing data for the telecommunications network from which the capabilities request or response message or presence information update message was received; and
storing the extracted mobile station number in association with the obtained routing data, wherein the stored routing data identifies the telecommunications network from which the identified capabilities request or response message or presence information update message was received;
if the extracted mobile station number has already been stored in association with routing data:
comparing the already stored routing data associated with the mobile number to the obtained routing data; and
comparing a predetermined priority of a particular telecommunications network identified by the already stored routing data to a predetermined priority of the telecommunications network from which the message was received; and
if the already stored routing data is different from the obtained routing data, performing either:

if the predetermined priority of the particular telecommunications network identified by the already stored routing data is lower than the predetermined priority of the telecommunications network from which the message was received, replacing the stored routing data with the obtained routing data; or if the predetermined priority of the particular telecommunications network identified by the already stored routing data is higher than the predetermined priority of the telecommunications network from which the message was received, not replacing the stored routing data with the obtained routing data.

\* \* \* \* \*